(12) United States Patent
Mitsuya (10) Patent No.: US 7,515,320 B2
(45) Date of Patent: Apr. 7, 2009

(54) HOLOGRAPHIC DEVICE

(75) Inventor: Shinji Mitsuya, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 323 days.

(21) Appl. No.: 11/221,464

(22) Filed: Sep. 7, 2005

(65) Prior Publication Data

US 2006/0077551 A1 Apr. 13, 2006

(30) Foreign Application Priority Data

Sep. 28, 2004 (JP) ............................. 2004-281139

(51) Int. Cl.
*G03H 1/04* (2006.01)
*G03H 1/22* (2006.01)
*H01S 5/00* (2006.01)

(52) U.S. Cl. .............................. 359/35; 359/32; 372/49
(58) Field of Classification Search .................. 359/35, 359/32; 372/49
See application file for complete search history.

(56) References Cited

U.S. PATENT DOCUMENTS

| 5,497,389 A | * | 3/1996 | Kasukawa et al. | ....... 372/49.01 |
| 5,966,364 A | | 10/1999 | Kamatani | ................... 369/112 |
| 6,055,174 A | | 4/2000 | Zhou et al. | ................... 365/125 |
| 6,243,180 B1 | * | 6/2001 | Kanterakis et al. | ............ 398/86 |
| 6,272,095 B1 | | 8/2001 | Liu et al. | |
| 6,430,136 B1 | * | 8/2002 | Gelbart | .................. 369/112.01 |
| 2001/0021208 A1 | | 9/2001 | Ucyanagi | ..................... 372/43 |
| 2001/0040868 A1 | | 11/2001 | Ucyanagi et al. | ............ 369/300 |

FOREIGN PATENT DOCUMENTS

JP 2000-155950 6/2000

OTHER PUBLICATIONS

European Search Report dated Nov. 21, 2006 for European application No. 052555619.8-1232.

* cited by examiner

*Primary Examiner*—Audrey Y Chang
(74) *Attorney, Agent, or Firm*—Beyer Law Group LLP (57) ABSTRACT

There is provided a holographic device that reproduces information by irradiating light beams emitted from a light beam generator onto a recording medium formed with a hologram. The light beam generator has a substrate and a plurality of light emitting units provided on the substrate, and each of the plurality of light emitting units is composed of a laser oscillator for emitting laser light having a wider wavelength bandwidth than single-mode laser light. In addition, a condensing means is provided between the light beam generator and the recording medium in order to condense a plurality of light beams emitted from each of the light emitting units onto approximately the same location of the recording medium.

7 Claims, 6 Drawing Sheets

HOLOGRAPHIC DEVICE

BACKGROUND OF THE INVENTION

1. Field of the Invention

The present invention relates to a holographic device that records/reproduces information by irradiating light beams emitted from a light beam generator onto a recording medium formed with holograms, and more specifically, to a holographic device that records/reproduces holograms that are multi-recorded by an angular multiplexing method by using a light beam having a wide wavelength bandwidth as a reference beam.

2. Description of the Related Art

Conventionally, there have been known storage devices which record information using a holographic principle. A hologram is formed in the recording medium by interference between an encoded object beam and a reference beam. When the hologram is reproduced, a reference beam, having the same wavelength and angle as when the hologram is written, is irradiated onto the hologram to thereby reproduce original information.

The characteristic of the holographic recording medium is that it enables a high density and a large amount of capacity. Further, the information can be multi-recorded by using an angular multiplexing method in which the angle of the reference beam changes, or a wavelength multiplexing method in which the wavelength of the reference beam changes, which enables a much higher density. Furthermore, as compared to conventional electronic storage devices which read out information in a sequential manner, the holographic storage devices can read out the information in a page unit at one time. Thereby, high-speed data processing can be realized.

In the angular multiplexing method, a conventional galvano mirror has been used in a holographic device to change the angle of the reference beam. A device, in which holograms multi-recorded by the angular multiplexing method are reproduced by means of the galvano mirror, is disclosed in Japanese Unexamined Patent Application Publication No. 2000-155950, for example.

However, in the conventional holographic devices, a complex driving unit for driving the galvano mirror and a control system for controlling the driving unit have been essential in order to precisely control the irradiation angle of the reference beam with respect to the recording medium. For this reason, it has been difficult to miniaturize the holographic device, to reduce a manufacturing cost thereof, and to ensure high reliability thereof.

Further, laser light has been used as the reference beam, however, the laser light generally has a very narrow wavelength range. Accordingly, when the irradiation angle of the reference beam with respect to the recording medium deviates slightly, a condition in which a light beam is diffracted by a hologram can not be satisfied, and as a result, the hologram can not be reproduced. Therefore, even in consideration of the above, the angle of the reference beam should be very precisely controlled, which causes the holographic device to be expensive.

SUMMARY OF THE INVENTION

The invention is designed to solve the above problems, and it is an object of the invention to provide a holographic device capable of reproducing multi-recorded holograms with a simple mechanism.

In order to achieve the above object, according to an aspect of the invention, there is provided a holographic device that reproduces information by irradiating light beams emitted from a light beam generator onto a recording medium formed with a hologram. The light beam generator has a substrate and a plurality of light emitting units provided on the substrate, and each of the plurality of light emitting units is composed of a light source for emitting laser light having a wider wavelength bandwidth than single-mode laser light. In addition, a condensing means is provided between the light beam generator and the recording medium in order to condense a plurality of light beams emitted from the light emitting units onto approximately the same location of the recording medium.

Further, in the holographic device according to the invention, it is preferable that the light source be composed of a laser oscillator for emitting laser light.

Furthermore, in the holographic device according to the invention, it is preferable that the laser oscillator emit multi-mode laser light and include a resonator having reflectors formed with unevenness on the surfaces thereof so that the length of the resonator differs depending on the position. Also, preferably, light having a wavelength depending on the length of the resonator is resonated to thereby make a wavelength bandwidth in a main mode and wavelength bandwidths in side modes increase, respectively, and thus the oscillating laser light has a half bandwidth such that wavelength distribution in the main mode is continuous with the wavelength distributions in the side modes, so that the laser light has a wider wavelength bandwidth than the single-mode laser light.

In addition, in the holographic device according to the invention, it is preferable that the laser oscillator emit multi-mode laser light and include a resonator having multi-layered filters functioning as reflectors, each of the multi-layered filters having a nearly flat and broad intensity distribution of reflected light along the thickness direction of the multi-layered filter so that the length of the resonator differs depending on the position. Further, preferably, light having a wavelength depending on the length of the resonator is resonated to thereby make a wavelength bandwidth in a main mode and wavelength bandwidths in side modes increase, respectively, and thus the oscillating laser light has a half bandwidth such that wavelength distribution in the main mode is continuous with the wavelength distributions in the side modes, so that the laser light has a wider wavelength bandwidth than the single-mode laser light.

Further, according to another aspect of the invention, there is provided a holographic device that reproduces information by irradiating light beams emitted from a light beam generator onto a recording medium formed with a hologram. The light beam generator has a substrate and a plurality of light emitting units provided on the substrate, and a condensing means is provided between the light beam generator and the recording medium in order to condense a plurality of light beams emitted from the light emitting units onto approximately the same location of the recording medium. Each of the light emitting units is composed of a wavelength-tunable laser oscillator, and the wavelength-tunable laser oscillator having a current modulator for generating a current having an amplitude that changes within a predetermined range. A modulated current generated by the current modulator is supplied to the laser oscillator to change the wavelength of oscillating laser light within a predetermined range and then the laser light having the changed wavelength is incident on the recording medium.

Furthermore, in the holographic device according to the invention, it is preferable that the light source be composed of an LED or an RCLED.

In addition, in the holographic device according to the invention, it is preferable that the plurality of light emitting units provided on the substrate be disposed in an array.

Moreover, in the holographic device according to the invention, it is preferable that the light beam generator be provided with a band pass filter disposed to be adjacent to the light emitting units.

DESCRIPTION OF THE PREFERRED EMBODIMENT

Figure 1:
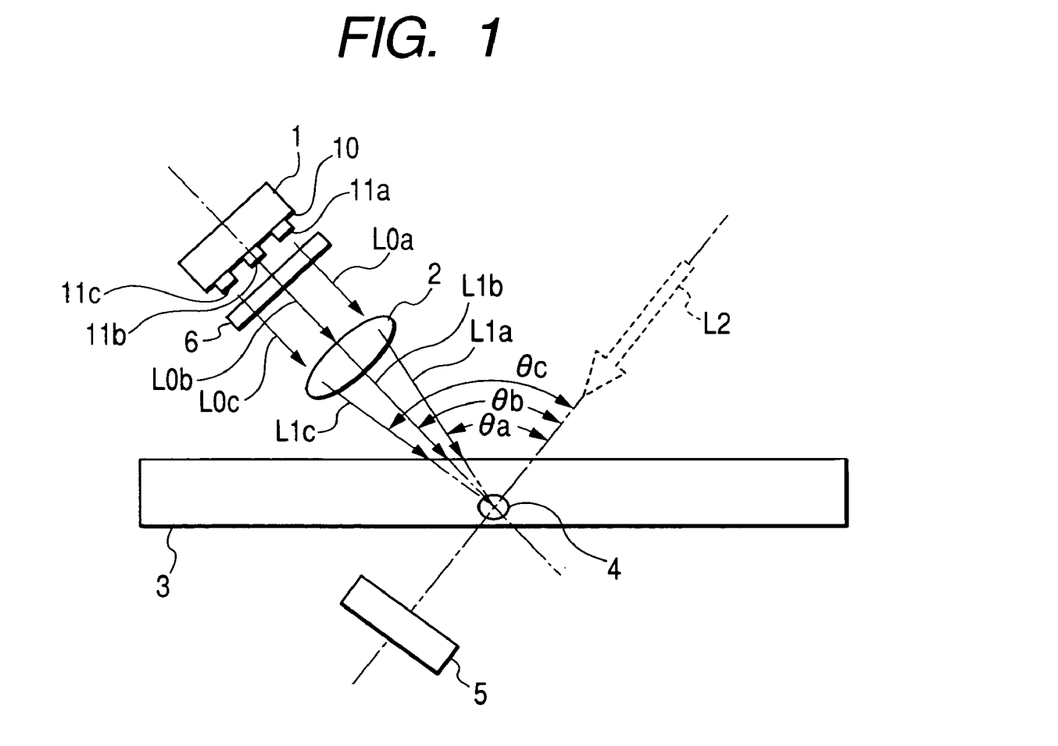
FIG. 1 is a view schematically showing a holographic device according to an embodiment of the invention.

Hereinafter, the preferred embodiments of the invention will be described in detail with reference to the accompanying drawings. As shown in FIG. 1, the holographic device of the present embodiment is mainly composed of a light beam generator 1 in which light emitting units 11a, 11b and 11c are disposed on a substrate 10, a band pass filter 6 disposed to be adjacent to the light emitting units 11a, 11b, and 11c of the light beam generator 1, a condensing lens 2 which condenses light beams emitted from the light beam generator 1 onto a hologram 4 in a recording medium 3, and a light receiving unit 5 which receives light exiting from the hologram 4. The holographic device shown in FIG. 1 reproduces the hologram 4.

The hologram 4 in the recording medium 3 is formed by irradiating an object beam and a reference beam at a predetermined angle to generate interference fringe. In order to read out information recorded in the recording medium 3, the same light beam as a reference beam used to form the hologram 4 is incident on the recording medium 3, and then the light beam incident on the recording medium 3 is diffracted to reproduce an original image. The diffracted light is received in the light receiving unit 5 composed of, for example, a CMOS, and thus the information is read out. Also, the light receiving unit 5 may be composed of a CCD or the like.

Here, in order to form the hologram 4, spatial multiplexing method in which the angle of the reference beam changes is performed. In other words, the recording medium 3 can be written with a plurality of information items at the same location thereof by changing the angle of the reference beam when the hologram 4 is formed. In order to read out the information, a light beam having the wavelength of the reference beam used to write the information is incident on the recording medium 3 at the same angle as when it is written, thereby reproducing each multiplexed hologram 4.

Figure 2:
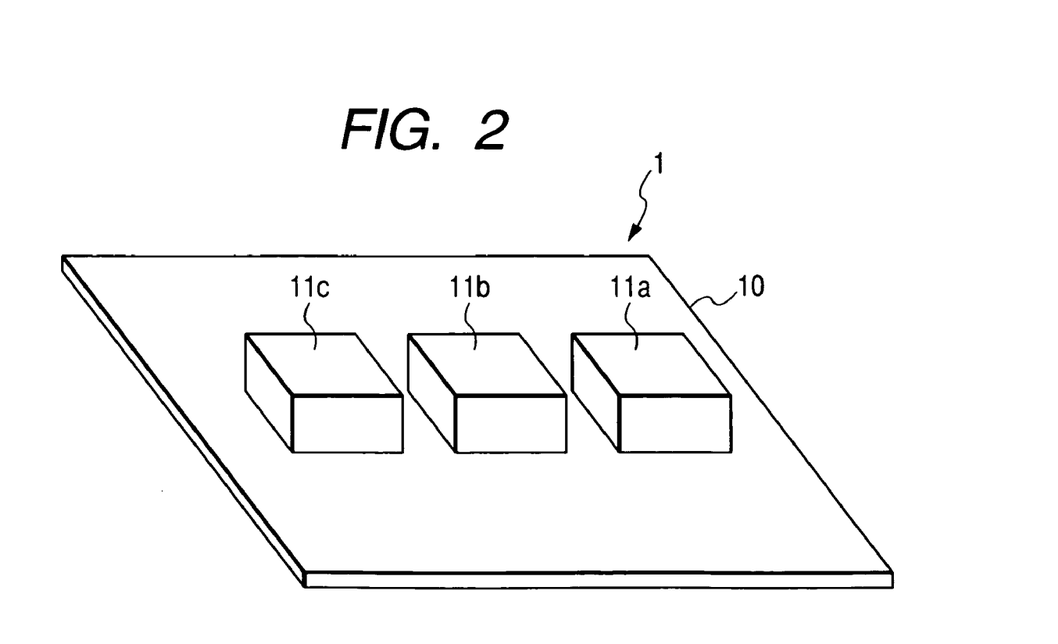
FIG. 2 shows a perspective view of a light beam generator.

Next, the light beam generator 1 will be described. FIG. 2 shows a perspective view of the light beam generator 1. As shown in FIG. 2, the light beam generator 1 is constructed by arranging the plurality of light emitting units 11, 11b, and 11c on the substrate 10. Alternatively, for example, it is possible to use light beams emitted from a light source provided at a different location by using an optical fiber. In addition, the arrangement pattern is not limited to the shape shown in FIG. 2, but a cross shape, an elliptical shape, a square shape or the like may be considered as the arrangement pattern. In any case mentioned above, the light beam generator 1 is constructed by arranging the light emitting units 11a, 11b, and 11c on the substrate 10 in an array. In the present embodiment, an example will be described in which the light emitting units 11a, 11b, and 11c are arranged in a straight line.

The light emitting units 11a, 11b, and 11c generate light beams L0a, L0b, and L0c each having a wide bandwidth, respectively. The condensing lens 2 condenses light beams emitted from the light beam generator 1 onto approximately the same location of the recording medium 3. Further, light beams L1a, L1b, and L1c exiting from the condensing lens 2 become reference beams for reproducing the hologram 4.

Next, reproduction of a hologram multi-recorded by an angular multiplexing method will be described in detail. As shown in FIG. 1, the light emitting units 11a, 11b, and 11c of the light beam generator 1 generate the light beams at different locations, respectively, so that the exiting light beams L1a, L1b, and L1c, which are incident on the recording medium 3 through the condensing lens 2, are incident on the hologram 4 at different angles, respectively.

The light beam L0a emitted from the light emitting unit 11a changes the propagating direction by the condensing lens 2 so as to become the light beam L1a, and then the light beam L1a is incident on the hologram 4 under a condition which the angle between the light beam L1a and the object beam L2 for recording is $\theta_a$. The light beam L0b emitted from the light emitting unit 11b passes through the condensing lens 2 to become the light beam L1b, and then the light beam L1b is incident on the hologram 4 under a condition which the angle between the light beam L1b and the object beam L2 is $\theta_b$. The light beam L0c emitted from the light emitting unit 11c changes the propagating direction by the condensing lens 2 to become the light beam L1c, and then the light beam L1c is incident on the hologram 4 under a condition which the angle between the light beam L1c and the object beam L2 is $\theta_c$.

When the light beams emitted from the light emitting units 11a, 11b, and 11c are simultaneously incident on the hologram 4, a plurality of information items are reproduced at the same time, but the information can not be separated in the light receiving unit 5. For this reason, the light beams from the light beam generator 1 are sequentially output by sequentially emitting the light emitting units 11a, 11b, and 11c, and thus the information of the multi-recorded hologram 4 is sequentially read out for each angle.

Here, when a reference beam is incident on the hologram 4 in the recording medium 3, the relationship between the incidence angle $\theta$ and the wavelength $\lambda$ of the reference beam for diffraction is represented by the following equation: $n\lambda = 2d \sin \theta$ (where n is a positive integer, and d is a gap between lattice surfaces). Accordingly, even though the positional relationship between the reference beam and the recording medium 3 is slightly out of balance to cause the incidence angle θ of the reference beam to deviate, it is possible to correct the deviation by changing the wavelength of the reference beam. For this reason, laser light having a wide wavelength bandwidth is incident on the recording medium 3 as the reference beam. As such, laser light having a predetermined wavelength diffracts satisfying the above equation, and as a result, it becomes possible to reproduce information recorded in the recording medium 3 by means of the diffracted light.

Figure 3:
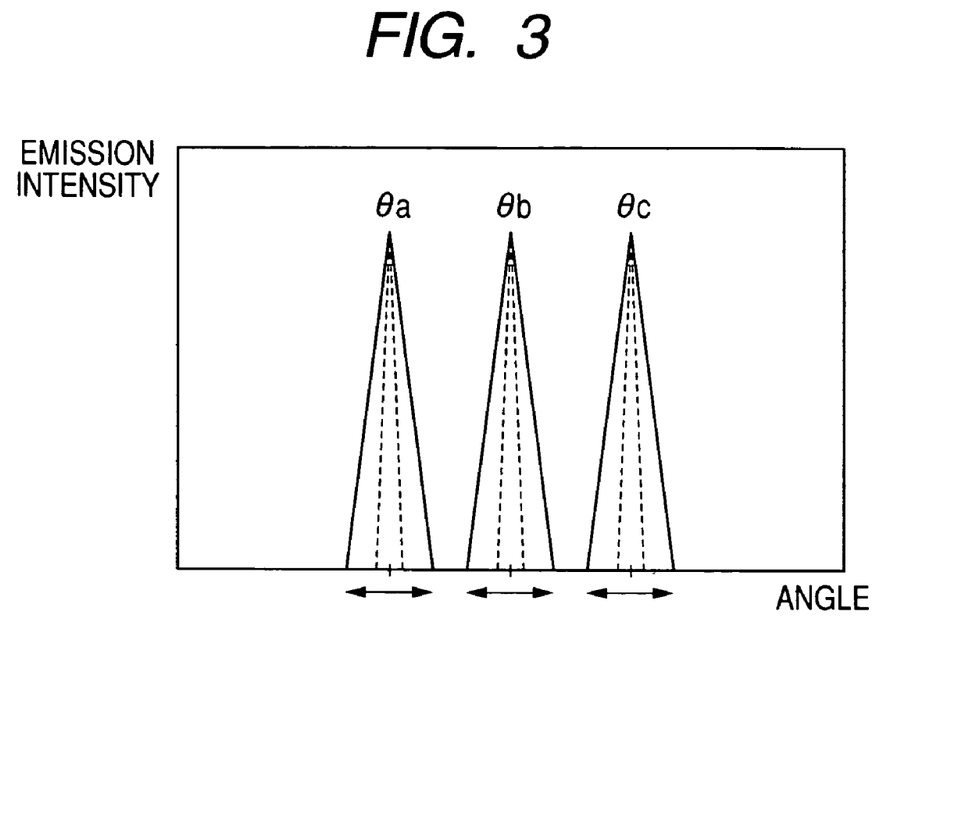
FIG. 3 is a view showing the relationship between the incidence angle of a reference beam to be incident on a hologram and the emission intensity of diffracted light.

FIG. 3 is a view showing the relationship between the incidence angle of a reference beam with respect to the hologram 4 and the emission intensity of a light beam exiting from the hologram 4. In the present embodiment, assuming that the incidence angles of the reference beam with respect to the recording medium 3 are $\theta_a$, $\theta_b$, and $\theta_c$, light beams each having the largest emission intensity are emitted from the respective multi-recorded holograms 4.

Dotted lines in FIG. 3 show single-mode laser light characteristics. In this case, it can be seen that when the incidence angle deviates slightly from each of the incidence angles $\theta_a$, $\theta_b$, and $\theta_c$, the intensity of diffracted light becomes zero. To the contrary, in a case of using the light beam generator 1 of the present embodiment, each of the light beams has a predetermined angular width so as to obtain a predetermined emission intensity even before and after each of the incidence angles $\theta_a$, $\theta_b$, and $\theta_c$. As such, since each of the light beams emitted from the light emitting units 11a, 11b, and 11c of the light beam generator 1 has a wider wavelength bandwidth than single-mode laser light, the reference beam can be diffracted by the hologram 4 even though the incidence angle deviates slightly.

The band pass filter 6, which is provided to be adjacent to the light emitting units 11a, 11b, and 11c of the light beam generator 1, is used to extract proper wavelength band when the wavelength bandwidth of the light beam emitted from each of the light emitting units 11a, 11b, and 11c is too wide. Thereby, the wavelength bandwidth of each light beam can be adjusted to the optimal bandwidth.

Figure 4:
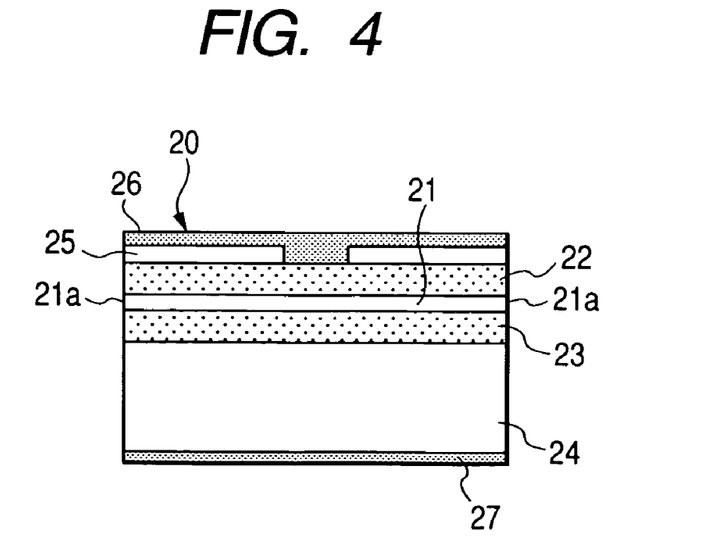
FIG. 4 is a cross-sectional view showing a semiconductor laser according to the embodiment.

Next, a configuration of the light beam generator 1 having a wide wavelength bandwidth will be described in detail. FIG. 4 is a cross-sectional view showing a semiconductor laser 20, which serves as each of the light emitting units 11a, 11b, and 11c. As shown in FIG. 4, the semiconductor laser 20 is constructed by interposing an active layer 21 between p-type and n-type cladding layers 22 and 23, and by providing a substrate 24, an insulator 25, and positive and negative electrodes 26 and 27 at the outer sides of the p-type and n-type cladding layers 22 and 23. Side surfaces of the active layer 21 are referred to as cleavage planes 21a, and serve as reflective mirrors by using the difference in the refractive index. The cleavage planes 21a reflect a light beam, the reflected light beam resonates in the active layer 21 to be amplified, and the amplified light beam oscillates as laser light when it exceeds a threshold value.

Figure 5:
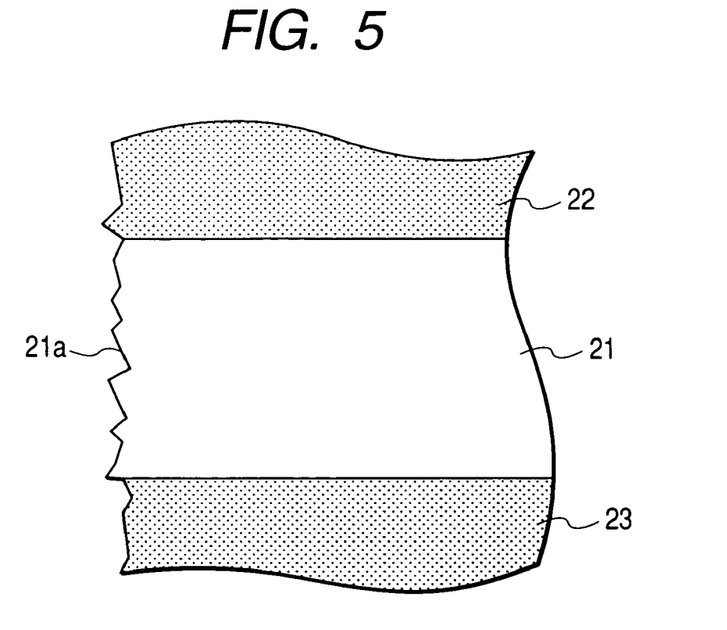
FIG. 5 is an enlarged cross-sectional view in the vicinity of the cleavage plane of the semiconductor laser.

FIG. 5 is an enlarged cross-sectional view in the vicinity of the cleavage plane 21a. Typically, the cleavage plane 21a becomes a very clean flat surface by means of a machining process, and thus laser light having a narrow half bandwidth can oscillate. However, in the present embodiment, the cleavage plane 21a is formed with unevenness, as shown in FIG. 5. In general, the semiconductor laser is formed by stacking a cladding layer, an active layer, an electrode, and the like with respect to a substrate having an area corresponding to several tens of semiconductor lasers and then by cutting the stacked structure to be separated from one another. Accordingly, when cutting the stacked structure, the cutting surface can be made to be rougher than in a normal case, thereby forming unevenness on the cleavage plane 21a.

In the present embodiment, by forming unevenness on the cleavage plane 21a, the laser light has continuous wavelength distribution over a main mode and side modes. The wavelength λ of the laser light oscillating from the active layer 21 satisfies the following equation: $\lambda m=2\,L/m$ (where m is a positive integer, and L is a length from a cleavage plane of the active layer to the other cleavage plane thereof). Here, in the embodiment, the length L differs depending on the position due to the unevenness formed on the cleavage planes 21a, so that the laser light emitted from the semiconductor laser 20 oscillates at various wavelengths depending on the length L.

Figure 6:
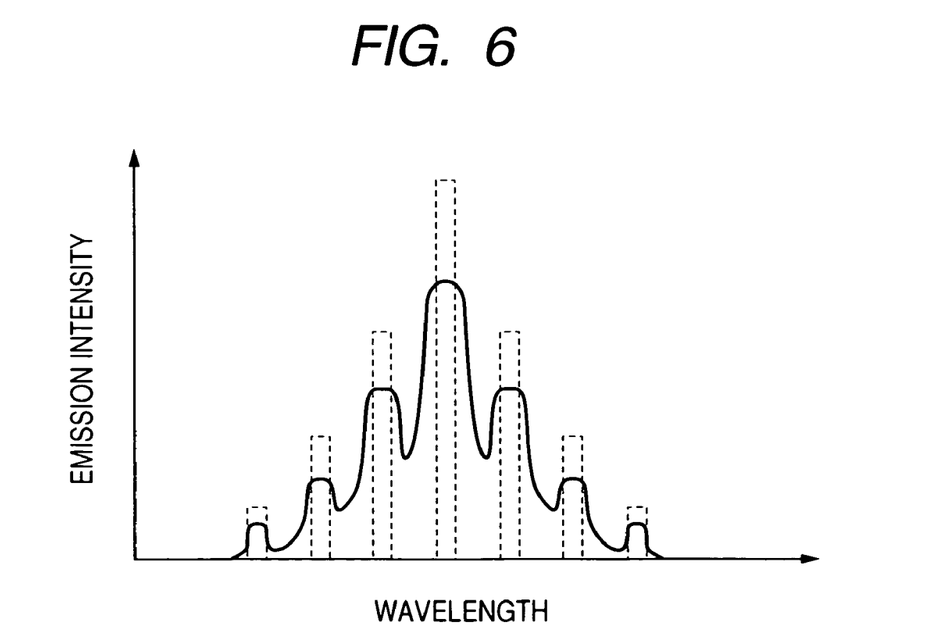
FIG. 6 is a view showing the characteristics of the emission intensity of laser light emitted from the semiconductor laser with respect to the wavelength thereof.

Thus, as shown in FIG. 6, although the emission intensity of light is reduced, laser light, having a wavelength in the vicinity of the main-mode wavelength having the highest intensity, can be output in side modes, and the half bandwidths in the main mode and the side modes become wider. Also, the wavelength distribution of the laser light, which is not originally continuous, becomes continuous over the main mode and the side modes, since laser light in the main mode and the side modes have wider half bandwidth than the original one. At this time, when the difference between the highest intensity of light beam in the main mode and the intensity of light beam in the side mode which is continuous with the main mode is smaller than or equal to 20 dB, the laser light has a sufficient intensity even at the wavelengths between the main mode and the side modes.

Figure 7:
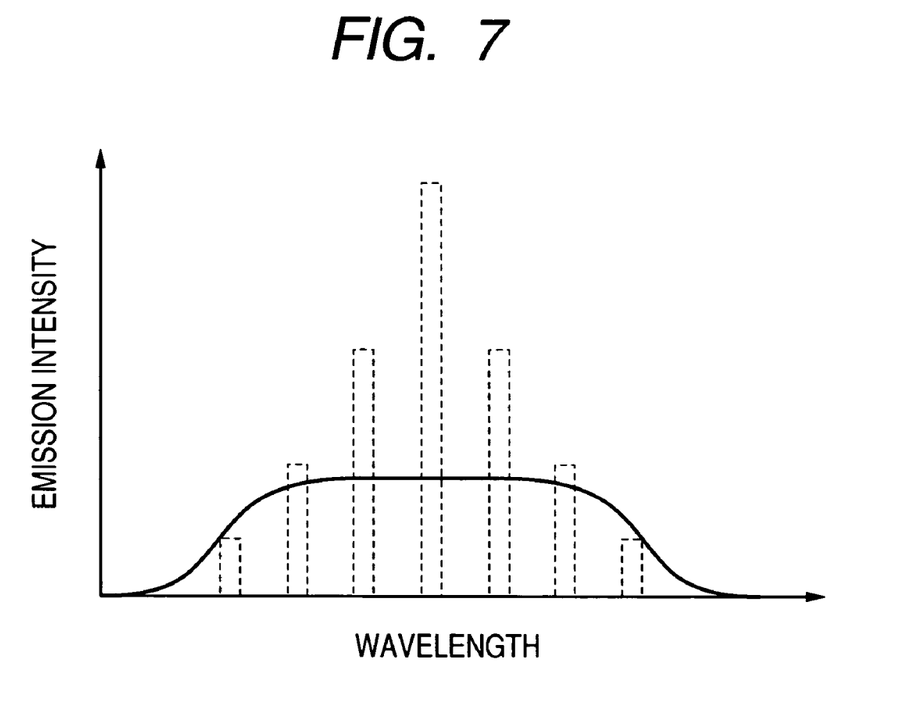
FIG. 7 is a view showing the characteristics of the emission intensity of laser light in which wavelengths in the respective modes are continuously distributed.

Further, the half bandwidth in each mode is determined based on the size of unevenness to be formed on the cleavage planes 21a. If the size of the unevenness is large, the length L significantly changes depending on the position. That is, the half bandwidth of oscillating laser light in each mode becomes wide. Therefore, large unevenness may be formed on the cleavage planes 21a so that the laser light has a wide half bandwidth in each mode, thereby emitting laser light having a nearly flat and broad wavelength distribution in which all of the modes are continuous, as shown in FIG. 7. As such, laser light having approximately the same intensity in a predetermined wavelength range can be incident on the holographic recording medium 10 so that the output of the diffracted light can be substantially uniform. In this case, it is necessary that the emission intensity of laser light emitted from the semiconductor laser 20 be sufficiently high.

Furthermore, in holographic recording, there is a case in which the information obtained by multiplexing the wavelength of laser light is multi-recorded. In this case, to avoid interference with other multiplexed laser light, the wavelength range of the laser light having the continuous wavelength distribution is required to be smaller than the distance between the wavelengths of the laser light in wavelength multiplexing.

Figure 8:
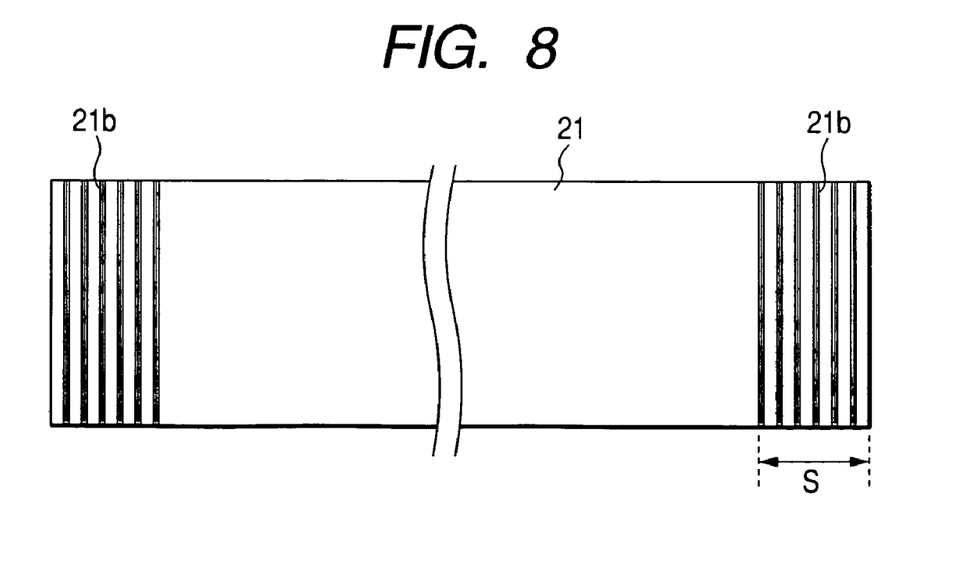
FIG. 8 shows an enlarged cross-sectional view of an active layer of a semiconductor laser according to a second embodiment of the invention.

Next, a second embodiment of the invention will be described. FIG. 8 is an enlarged cross-sectional view of an active layer 21 of a semiconductor laser 20 according to the second embodiment. The configuration of a holographic device according to the embodiment is the same as that described in the first embodiment. Also, the configuration of the semiconductor laser 20 is the same as that in the first embodiment except for the configuration of the active layer 21. In the present embodiment, unlike the first embodiment, multi-layered filters 21b are respectively provided on both side surfaces of the active layer 21. The multi-layered filters 21b each have a predetermined reflectivity and serve as the cleavage plane 21a in the first embodiment.

Figure 9:
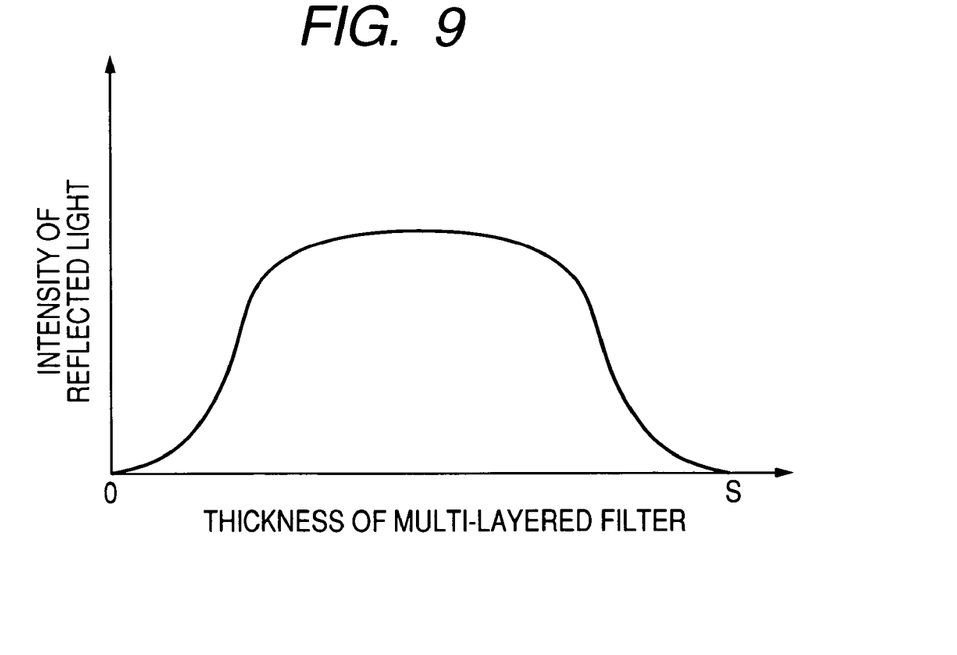
FIG. 9 is a graph showing the intensity distribution of reflected light in a multi-layered filter according to the second embodiment of the invention.

FIG. 9 is a graph showing the reflection characteristics of the multi-layered filter 21b. In a conventional reflective mirror composed of a multi-layered filter, the multi-layered filter is formed such that the maximum intensity of reflected light is located within 30% of the entire thickness S of the multi-layered filter and the reflected light has an intensity distribution only in the vicinity of the maximum intensity. To the contrary, as shown in FIG. 9, the multi-layered filter 21b of the present embodiment is configured such that the middle of the intensity distribution of reflected light is located around the middle of the entire thickness S and such that the intensity distribution of reflected light has a nearly flat and broad shape gradually changing along the thickness direction of the multi-layered filter 21b. Since modification of the thickness and structure of a multi-layered filter allows the multi-layered filter to have a predetermined intensity distribution of reflected light, it becomes possible to fabricate the multi-layered filters 21b having the above-described intensity distribution of reflected light.

Since the multi-layered filters 21b are configured such that the middle of the intensity distribution of reflected light is located around the middle of the entire thickness S and such that the intensity distribution of reflected light has a nearly flat and broad shape gradually changing along the thickness direction of the multi-layered filter 21b, a resonator has different lengths depending on position, similar to the first embodiment, and thus the semiconductor laser 20 emits laser light having various wavelengths. Thereby, as shown in FIG. 6, although the emission intensity of light is reduced, laser light, having wavelengths in the vicinity of the main-mode wavelength with the highest intensity, can be output in side modes so as to make the half bandwidths in the main mode and the side modes wide, and accordingly, the wavelengths of laser light become continuously distributed over the main mode and the side modes.

Alternatively, the length of the resonator may be changed by constructing each of the multi-layered filters 21b to have a thickness 1.5 times larger than the minimum thickness to exhibit a predetermined intensity of reflected light necessary for the resonator, and to have the same intensity of reflected light as in the case of the minimum thickness, without the intensity distribution of reflected light having the nearly flat and broad shape.

In the first and second embodiments, the light emitting units 11a, 11b, and 11c, each emitting laser light having a wide wavelength bandwidth, are used. For example, a self-oscillating semiconductor laser or an LED may be used to emit light having a wide wavelength bandwidth. Further, an RCLED (resonant cavity light emitting diode) having a wide wavelength bandwidth may be used. The RCLED has an intermediate property between the laser and the LED, and the spectrum width of the RCLED is wider than that of the LED but smaller than that of the laser. Also, coherence characteristics of the RCLED is superior to the LED but inferior to that of the laser.

Figure 10:
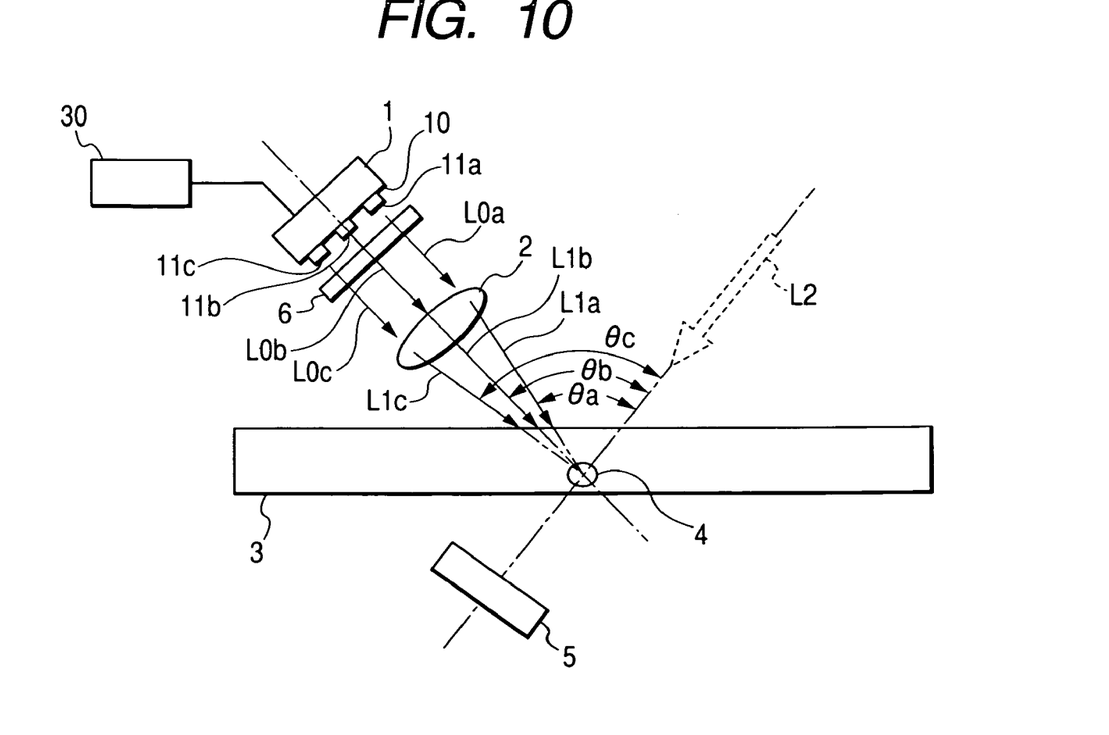
FIG. 10 is a view schematically showing a holographic device according to a third embodiment.

Next, a third embodiment of the invention will be described. FIG. 10 is a view schematically showing a holographic device according to the third embodiment. As shown in FIG. 10, the basic configuration of the holographic device of the embodiment is substantially the same as that of the first embodiment, except that a current modulator 30 is connected to the light beam generator 1.

Here, unlike in the first embodiment, each of the light emitting units 11a, 11b, and 11c in the present embodiment is not a semiconductor laser in which cleavage planes 21a are provided with unevenness, but is a typical semiconductor laser in which the cleavage planes 21a are subjected to a planarization process so as to be flat. In addition, a current is supplied to each of the light emitting units 11a, 11b, and 11c through the current modulator 30.

It is known that when a current input to a semiconductor laser changes, the wavelength of laser light emitted from the semiconductor laser slightly changes. Therefore, when the current modulator 30 generates a current, having an amplitude changing within a predetermined range, such as a sine wave, and the modulated current is supplied to each of light emitting units 11a, 11b, and 11c, the wavelength of the laser light can change in the predetermined range. The current modulator 30 is composed of an FET, and the like.

Alternatively, in the light emitting units 11a, 11b, and 11c, as in the second embodiment, multi-layered filters 21b may be provided on the side surfaces of the active layer 21 so that the multi-layered filters 21b function as reflective mirrors. In this case, however, multi-layered filters each having a known intensity distribution of reflected light is employed, instead of the multi-layered filters 21b having the nearly flat and broad intensity distribution described in the second embodiment.

Figure 11:
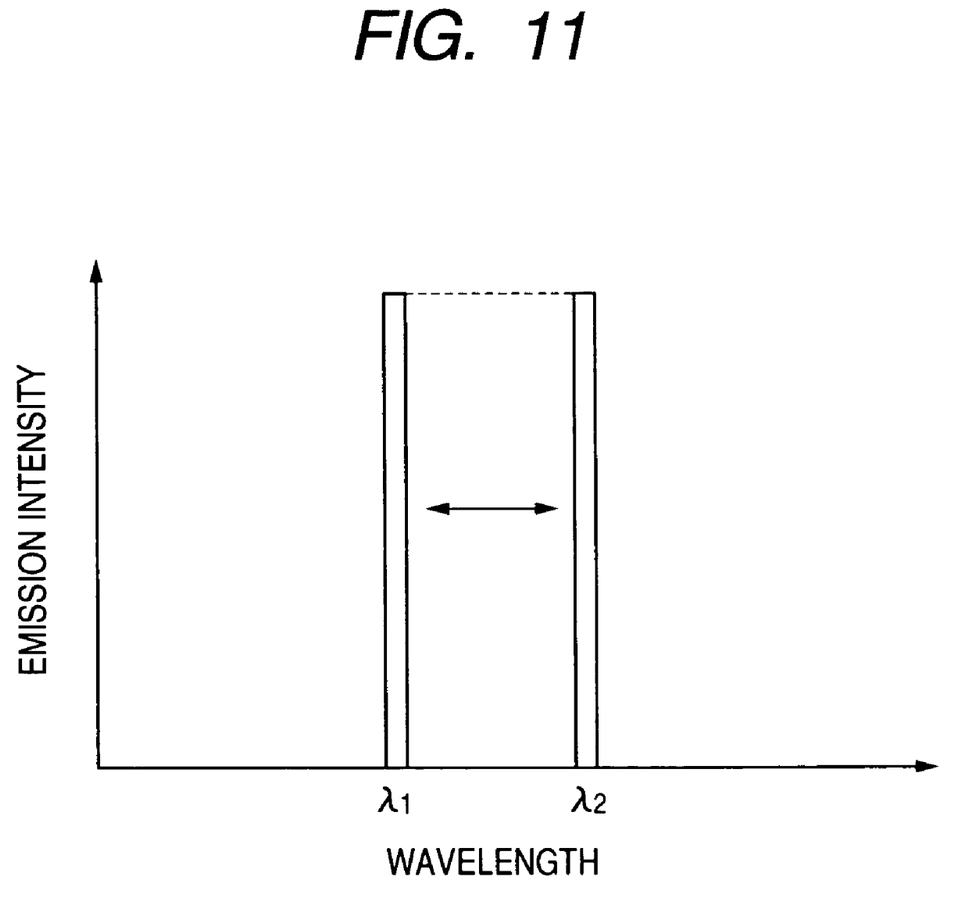
FIG. 11 is a view showing a distribution of the emission intensity of laser light emitted from a semiconductor laser according to a third embodiment.

Assuming that an oscillation period during which the wavelength of laser light changes from a minimum wavelength $\lambda 1$ to a maximum wavelength $\lambda 2$ is one oscillation period, the laser light emitted from a laser oscillator can have a wavelength bandwidth from the minimum wavelength $\lambda 1$ to the maximum wavelength $\lambda 2$, as shown in FIG. 11. Accordingly, even though the positional relationship between the reference beam and the holographic recording medium 3 is slightly out of balance to cause the incident angle $\theta$ of the reference beam to deviate, a light beam having one of the wavelengths in the above wavelength range diffracts satisfying the diffraction condition, thus reproducing the information recorded in the holographic recording medium 3 by means of the diffracted light. In order that the laser light diffracts reliably, the laser light needs to be emitted onto the holographic recording medium 3 at least for one period of current variation.

According to the holographic device of the invention, the light beam generator includes a plurality of light emitting units, so that it is easy to vary the incidence angle of a reference beam only by switching among the light emitting units in order to change the emitting position of the reference beam. Also, since the light generated by the light beam generator has a wide wavelength bandwidth, a hologram can be reproduced even when the incidence angle of the light with respect to a recording medium deviates. As a result, it is possible to perform an angular multiplexing with a simple configuration and to increase reliability of the holographic device.

Further, according to the holographic device of the invention, the laser oscillator includes a resonator having reflectors formed with unevenness on the surfaces thereof so that the length of the resonator differs depending on the position, so that laser light having a wide wavelength bandwidth can be easily generated. Similarly, since the laser oscillator includes a resonator having multi-layered filters functioning as reflectors, each of the multi-layered filters having a nearly flat and broad intensity distribution of reflected light along the thickness direction of the multi-layered filter so that the length of the resonator differs depending on the position, laser light having a wide wavelength bandwidth can be easily generated.

Furthermore, according to the holographic device of the invention, since a current having an amplitude changing within a predetermined range is supplied to the laser oscillator and the wavelength of oscillating laser light changes within a predetermined range, assuming that an oscillation period during which the wavelength of laser light changes from a minimum wavelength to a maximum wavelength is one oscillation period, the laser light can have a wide wavelength bandwidth ranging from the minimum wavelength to the maximum wavelength, and a hologram can be reproduced even when the incidence angle of the laser light with respect to a recording medium deviates.

In addition, according to the holographic device of the invention, the light emitting units are disposed in an array, so that it is easy to vary the incidence angle of a reference beam only by switching among the light emitting units in order to change the emitting position of the reference beam.

Moreover, according to the holographic device of the invention, the light beam generator is provided with a band pass filter disposed to be adjacent to the light emitting units, so that the wavelength bandwidth of light can be adjusted to the optimal bandwidth.

Having described the embodiments of the invention, it is to be understood that the invention is not limited thereto, but various changes and modifications thereof can be made without departing from the spirit or scope of the invention.

The invention claimed is:

1. A holographic device that reproduces information by irradiating light beams emitted from a light beam generator onto a recording medium formed with a hologram,
   wherein the light beam generator has a substrate and a plurality of light emitting units provided on the substrate, each of the plurality of light emitting units being composed of a light source for emitting laser light having a wavelength range wider than a wavelength range of single-mode laser light,
   a condensing means is provided between the light beam generator and the recording medium in order to condense a plurality of light beams emitted from the light emitting units onto approximately the same location of the recording medium, and
   the light beam generator sequentially outputs the plurality of light beams from the plurality of light emitting units, the plurality of light beams being irradiated onto the recording medium at different incident angles, the wider wavelength range of the light beams allowing to reproduce the hologram even if an incident angle of the light beams with respect to the recording medium deviates.

2. The holographic device according to claim 1, wherein the light source is composed of a laser oscillator for emitting laser light.

3. The holographic device according to claim 2, wherein the laser oscillator emits multi-mode laser light and includes a resonator having reflectors formed with unevenness on the surfaces thereof so that the length of the resonator differs depending on the position,
   and the laser light having a wavelength depending on the length of the resonator so as to increase a half bandwidth in a main mode and half bandwidths in side modes, respectively, such that the oscillating laser light has a wavelength distribution in the main mode which is continuous with the wavelength distributions in the side modes, so that the laser light has a wavelength range wider than the wavelength range of the single-mode laser light.

4. The holographic device according to claim 2, wherein the laser oscillator emits multi-mode laser light and includes a resonator having multi-layered filters functioning as reflectors, each of the multi-layered filters having a nearly flat and broad intensity distribution of reflected light along the thickness direction of the multi-layered filter so that a resonance wavelength of the resonator varies depending on the position in the thickness direction, and
   the laser light is resonated by the resonator having the varying resonance wavelength depending on the position in the thickness direction to increase a half bandwidth in a main mode and half bandwidths in side modes, respectively, such that the oscillating laser light has a wavelength distribution in the main mode which is continuous with the wavelength distributions in the side modes, so that the laser light has a wavelength range broader than the wavelength range of the single-mode laser light.

5. The holographic device according to claim 1, wherein the light source is composed of an LED or an RCLED.

6. The holographic device according to claim 1, wherein the plurality of light emitting units provided on the substrate are disposed in an array.

7. The holographic device according to claim 1, wherein the light beam generator is provided with a band pass filter disposed adjacent to the light emitting units, the band pass filter adjusting a range of wavelength of the light beam emitted form each of the light emitting units.

* * * * *